(12) United States Patent
Engelaere

(10) Patent No.: US 6,302,290 B1
(45) Date of Patent: *Oct. 16, 2001

(54) CONTAINER SEALING ASSEMBLY

(75) Inventor: Jean-Claude Engelaere, Coudekerque-Branche (FR)

(73) Assignee: Atofina (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,900

(22) PCT Filed: Nov. 28, 1996

(86) PCT No.: PCT/FR96/01884
§ 371 Date: Apr. 19, 1999
§ 102(e) Date: Apr. 19, 1999

(87) PCT Pub. No.: WO97/19867
PCT Pub. Date: Jun. 5, 1997

(30) Foreign Application Priority Data
Nov. 29, 1995 (FR) .................................................. 95 14117

(51) Int. Cl.⁷ .............................. B65B 7/00; B65D 41/00; B65D 41/32
(52) U.S. Cl. ................................... 220/359.4; 220/359.1; 220/359.3; 220/62.13; 220/62.12; 156/69; 156/580
(58) Field of Search ................................ 220/359.4, 359, 220/1, 359.2, 359.3, 612, 265, 266, 268, 269, 270, 359.5, 62.11, 62.12, 62.13, 62.22, 610, 613, FOR 127, FOR 186, 156.53; 156/69, 219, 220, 580.2, 73.1; 53/329, 329.2, 329.3, 289, 290, 172, 173, 477, 478, 467, 471

(56) References Cited

U.S. PATENT DOCUMENTS

| 3,335,939 | 8/1967 | Robinson . |
|---|---|---|
| 3,454,210 | 7/1969 | Spiegel et al . |
| 3,946,872 | 3/1976 | Sturm . |
| 4,280,653 | 7/1981 | Elias . |
| 4,381,848 | 5/1983 | Kahn . |

(List continued on next page.)

FOREIGN PATENT DOCUMENTS

| 9114409 | 4/1992 | (DE) . |
|---|---|---|
| 0 160 975 A2 | 11/1985 | (EP) . |
| 0554152 A | 8/1993 | (EP) . |
| 0 661 154 | 7/1995 | (EP) . |
| 2669607 | 5/1992 | (FR) . |

(List continued on next page.)

Primary Examiner—Allan N. Shoap
Assistant Examiner—Niki M. Eloshway
(74) Attorney, Agent, or Firm—Pennie & Edmonds LLP

(57) ABSTRACT

The sealing structure (S) for a container (C) provided with an opening (O) comprises a sheet (F) welded around the edge of the opening, this sheet (F) consisting of at least three layers, namely a welding layer (1) pressed against and welded as a bead (4) to the edge of the opening, a barrier-forming exterior layer (2) and an intermediate adhesive layer (3); the weld between the bead (4) of the welding layer (1) and the edge of the opening has a tear strength greater than the strength of adhesion between the welding layer (1) and the adhesive layer (3) so that, at the first occasion of exposing the opening (O), the welded bead (4) remains in place around the edge of the opening and separates from the rest of the welding layer (1) and from the adhesive layer (3), which adhesive layer is thus uncovered over an area (7) and makes it possible, by pressing again against the bead (4), to seal the container (C) again.

30 Claims, 2 Drawing Sheets

U.S. PATENT DOCUMENTS

| | | |
|---|---|---|
| 4,438,850 | 3/1984 | Kahn . |
| 4,673,601 | 6/1987 | Lamping et al. . |
| 4,689,099 * | 8/1987 | Ito et al. ................................ 156/69 |
| 4,693,390 | 9/1987 | Henkal . |
| 4,801,041 | 1/1989 | Takata et al. . |
| 4,858,780 | 8/1989 | Odaka et al. . |
| 4,913,307 * | 4/1990 | Takato et al. ................ 220/359.3 X |
| 5,061,532 | 10/1991 | Yamada . |
| 5,089,320 | 2/1992 | Straus et al. . |
| 5,145,737 | 9/1992 | Boiron et al. . |
| 5,178,293 * | 1/1993 | Suzuki et al. ..................... 220/359.3 |
| 5,316,603 * | 5/1994 | Akazawa et al. ............. 220/359.3 X |
| 5,382,472 | 1/1995 | Yanidis et al. . |
| 5,686,127 * | 11/1997 | Stockley, III et al. ........ 220/359.3 X |

FOREIGN PATENT DOCUMENTS

| | | |
|---|---|---|
| 1461698 A | 1/1977 | (GB) . |
| 1536428 A | 12/1978 | (GB) . |
| 2 319 746 | 6/1998 | (GB) . |
| WO93/08982 | 5/1993 | (WO) . |
| WO9640504A | 12/1996 | (WO) . |

* cited by examiner

CONTAINER SEALING ASSEMBLY

The invention relates to a sealing structure for a container provided with an opening, this structure being of the same kind as those which comprise a sheet welded around the edge of the opening of the container.

For economic and recycling reasons, products are being packaged in increasingly large amounts in the same container, in particular in the same package. This is a source of problems for the consumer who does not wish to use the packaged product at one time. After having opened the container in order to remove part of the contents, the consumer wants to be able to reseal the container easily and effectively and to restore part of its initial integrity which it possessed before it was opened. For example, in the case of foodstuffs, the consumer wants to be able to reseal the package before putting it back into his refrigerator in order to avoid the problem of an unpleasant smell, the problem of the packaged product drying out and the problem of loss of space, and to avoid other drawbacks.

This is also true for products other than foodstuffs, for example for industrial products packaged in large number, such as screws, nails and washers, as well as for pharmaceutical products, for example those in the form of pills or tablets.

These non-limiting examples show that there is a considerable demand, in very varied fields, for a sealing structure for containers which allows easy opening and effective and simple resealing of the container after part of its contents has been removed.

The object of the invention is therefore to provide a sealing structure which satisfies these requirements.

The object of the invention is also to provide a sealing structure which is relatively simple and inexpensive to manufacture and to fit onto the container.

According to the invention, a sealing structure for a container provided with an opening, comprising a sheet welded around the edge of the opening of the container, is characterized in that the sheet consists of at least three layers, namely a welding layer pressed against and welded as a bead to the edge of the opening, a barrier-forming exterior layer and an intermediate adhesive layer, the weld between the bead of the welding layer and the edge of the opening having a tear strength greater than the strength of adhesion between the welding layer and the adhesive layer so that, at the first occasion of exposing the opening, the welded bead of the welding layer remains in place around the edge of the opening and separates from the rest of the welding layer and from the adhesive layer, which adhesive layer is thus uncovered over an area corresponding to the said bead, it being possible for the container to be sealed again by pressing the uncovered area of the adhesive layer against the bead of the welding layer that has remained in place.

The exterior layer may consist of a flexible film; its thickness may be approximately 50 micrometers. Advantageously, the exterior layer is made of biaxially oriented polyester.

As a variant, the exterior layer may consist of a rigid film.

The welding layer consists of a thin film, the thickness being, in particular, about 20 micrometers, which is easy to tear, or of a thicker film having easy-tear properties obtained by adjusting the extrusion parameters or by adding mineral fillers.

By way of example, the welding layer may consist of a film of high-density polyethylene.

The adhesive layer is preferably formed by depositing a material to a thickness at least equal to 10 micrometers. This adhesive layer is formed, in particular, by a permanently tacky acrylic polymer, which is a solid at room temperature, or by a hot-melt adhesive based on a thermoplastic elastomer.

Advantageously, the materials of which the layers are composed comply with the legislation defining the use of adhesives in the context of food packaging. The layers may be transparent so that the structures sheet itself is transparent.

The invention also relates to a container sealed by such a sealing structure. The container may be formed by a rigid film or by a flexible film. In one embodiment, the container is made of a film of rigid PVC (polyvinyl chloride) covered on the inside by a film of linear polyethylene with a layer of polyurethane adhesive interposed between the two films.

The invention also relates to a method of sealing a container having an opening by a sheet welded around the edge of the opening, characterized in that, for the sealing process, a sheet is used which consists of at least three layers, namely a welding layer, a barrier-forming exterior layer and an intermediate adhesive layer and in that the sheet is joined to the edge of the container, in particular using a welding tool, by welding around a bead the weld being produced so as to cause the welding layer and the adhesive layer to waken and so as to establish a bond between the bead of the welding layer and the edge of the opening, having a tear strength greater than the strength of adhesion between the welding layer and the adhesive layer so that, at the first occasion of exposing the opening bead, the welded bead of the welding layer remains in place around the edge of the opening and separates from the rest of the welding layer and from the adhesive layer.

The sheet consisting of at least three layers may be produced by depositing the adhesive layer between the exterior and welding layers by the hot extrusion of an adhesive resin between these layers.

According to another option, the adhesive resin is deposited hot on the exterior layer before calendering the welding layer to the latter.

The sheet thus produced can be stored in reeled form since the welding layer protects the adhesive layer and prevents problems of blocking between turns in the reels of sheet.

Apart from the arrangements explained above, the invention consists of a number of other arrangements which will be explained in greater detail below with regard to embodiments described with reference to the drawings which are appended hereto but which are in no way limiting.

FIG. 1 of these drawings is a diagrammatic cross-section, greatly enlarged, of a sheet consisting of three layers for a sealing structure according to the invention.

Figure 7:
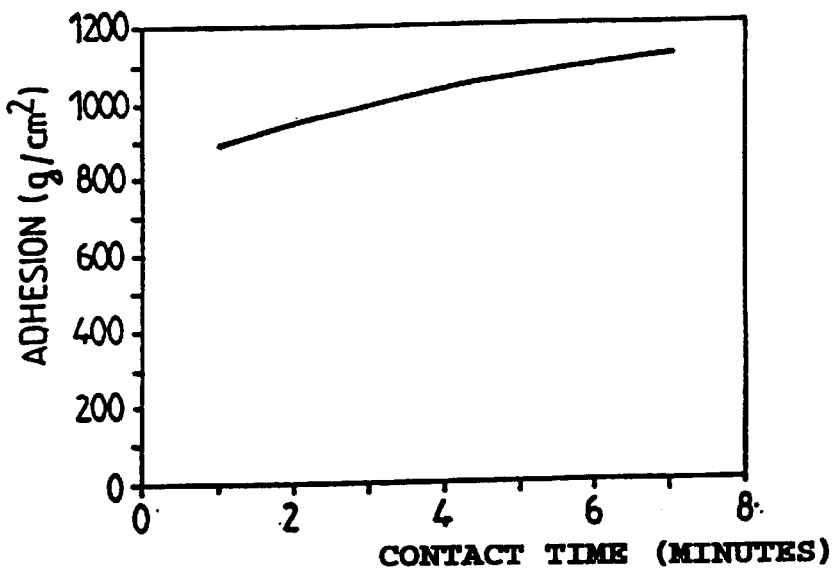
FIG. 7 is a diagram giving the variation in the strength of adhesion between two films, pressed against each other under a defined pressure, with an intermediate layer of an acrylic-polymer-based adhesive resin as a function of the contact time, expressed in minutes, plotted along the x-axis.
Figure 8:
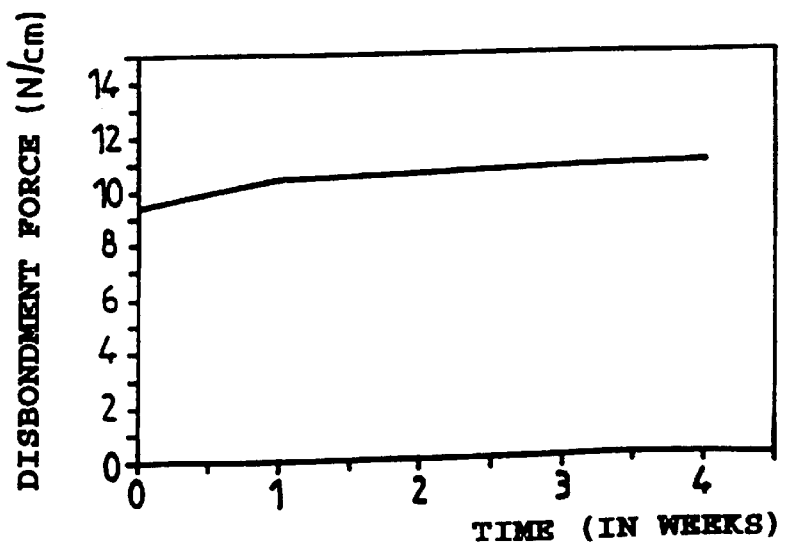

Finally, FIG. 8 is a diagram illustrating the variation in the disbandment force of an acrylic-polymer-based adhesive resin, expressed in newtons/centimetre (N/cm), between the two polyester films mentioned with regard to FIG. 7 as a function of time, expressed in weeks, plotted along the x-axis.

First of all, the characteristics of the hot-melt adhesive based on a thermoplastic elastomer will be recalled:

solid at room temperature melting point between 85 and 95° C.

density: 0.96 g/cm$^3$ dynamic viscosity:
  15,100 mPa.s at 150° C.
  11,100 mPa.s at 160° C.
  8,000 mPa.s at 170° C.

(measurements made on a Contraves RHEOMAT 115)

insoluble in water.

Figure 1:
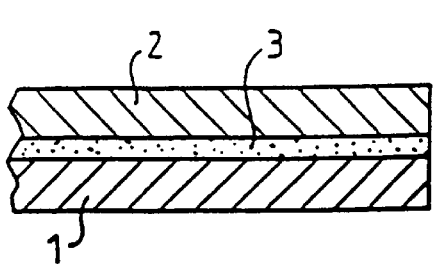
Figure 4:
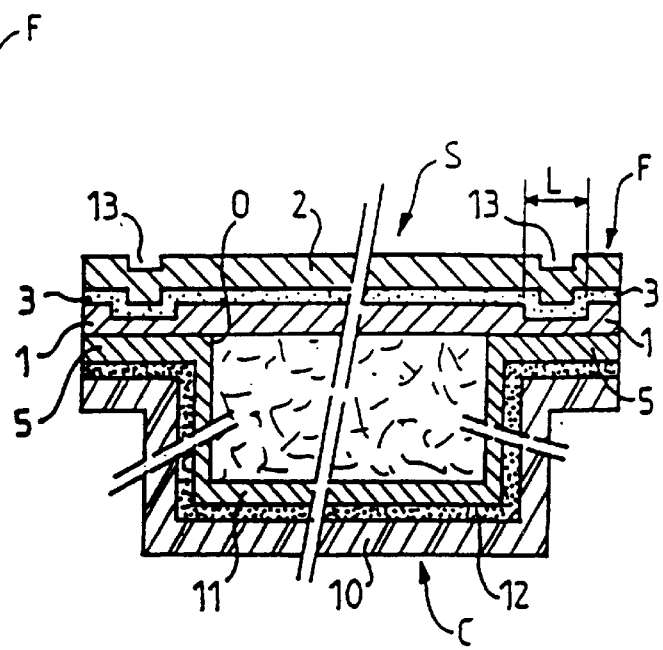
FIG. 4 is a highly enlarged diagrammatic section, with parts removed, of a container sealed by a sealing structure according to the invention.

Referring to the drawings, especially to FIGS. 1 and 4, it may be seen that the sealing structure S for a container C provided with an opening O comprises a sheet F consisting of at least three layers, namely a welding layer 1, an exterior layer 2 and an intermediate adhesive layer 3.

The exterior layer 2 is composed of a film constituting a "backing" which provides the structure with:

its barrier properties (gas impermeability, water-vapour impermeability, aroma impermeability, etc.);

its mechanical properties (rigidity, puncture strength, burst strength, etc.);

its thermal withstand capability (resistance to heat, to cold and to extrusion-lamination, etc.);

its inertness with respect to the surrounding medium;

its dimensional stability, this being important especially for printing a text and/or images;

its optical properties, such as shininess;

its ability to undergo treatment by a machine.

The exterior layer may be formed by a flexible or rigid film, depending on the type of container C, in particular depending on the type of package in question.

The welding layer 1 is intended to seal the container C. The nature of this layer 1 is chosen depending on:

its weldability to itself or to another material;

as wide as possible a weldability range so as to facilitate its passage through a machine;

weldability in soiled areas, for example those soiled by greases;

its chemical resistance to the products packaged in the container C.

The welding layer 1 is easy to tear, in order to allow the container C to be readily opened. This ease of tearing is achieved by using, for example, for the welding layer 1, a thin film, having a thickness of approximately 20 micrometers, or a thicker film offering easy-tear properties obtained, for example, by adjusting the extrusion parameters or by adding mineral fillers. According to the above remarks, the material of the film making up the welding layer 1 is defined depending on the layer used for the weld to the edge of the container C, as will be explained later.

The adhesive layer 3 provides the bonding between the exterior layer 2 and the welding layer 1. The adhesive layer 3 is chosen so as to give the structure the possibility of being resealed, after opening, by virtue of the almost permanent tack properties of the adhesive layer, as will be explained later.

The adhesive layer 3 may be deposited, for example, between the exterior layer 2 and the welding layer 1 by:

an extrusion technique (for example extrusion-lamination) which consists in extruding, hot, an adhesive resin between the films of which the exterior layer 2 and the welding layer 1, respectively, are composed;

a lamination technique which consists in depositing, hot, an adhesive resin on the film making up the exterior layer 2 before calendering the welding layer 1 onto the latter.

It is necessary to ensure that the adhesive layer 3 is deposited to a minimum thickness of 10 micrometers. Apart from the two processes mentioned above, any process allowing such a deposition to be achieved can be used.

The choice of the adhesive resin is important for allowing the container to be effectively resealed after the first opening.

Figure 6:
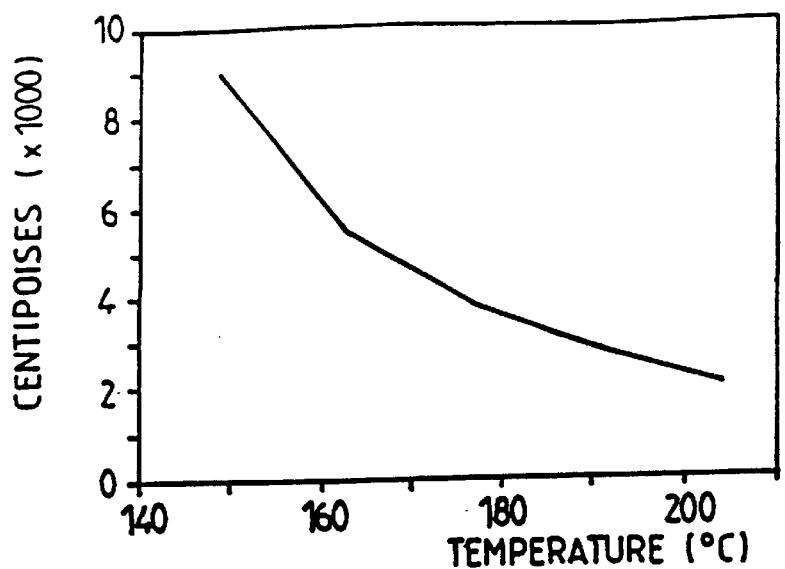
FIG. 6 is a diagram illustrating the variation in the viscosity, plotted along the y-axis, of an acrylic polymer used as the adhesive resin as a function of temperature, plotted along the x-axis.

An advantageous resin consists of a permanently tacky acrylic polymer which is in a solid form at room temperature and/or of a hot-malt adhesive based on a thermoplastic elastomer. FIG. 6 of the drawing illustrates the variation in the viscosity, plotted along the y-axis and expressed in thousands of centipoise, of the acrylic polymer as a function of temperature, plotted along the x-axis and expressed in degrees C. There is a glass transition at 65° C. and the melting point is between 70 and 80° C.

In the case of the acrylic polymer, the quality of the adhesive resin may be checked by depositing a 50 micrometre layer of adhesive on a polyester film (known by the name "mylar") at a temperature of 180° C. The measurement method consists in applying a second polyester film (also made of "mylar") against the polyester film coated with this layer of adhesive and in applying a defined pressure of 10 bar ($10 \times 10^5$ Pa) over an 8×8 mm square area for a given application time. The curve of adhesion (plotted along the y-axis) as a function of the contact times (plotted along the x-axis) curve is drawn. For the adhesive resin to be regarded as satisfactory, a curve similar to that shown in FIG. 7 should be obtained, in which the adhesion, plotted along the y-axis, is expressed in grams force/cm$^2$, i.e. in 0.01 newtons/cm$^2$.

The adhesive strengths obtained make it possible to reseal the container, after opening, and to ensure its integrity.

The diagram in FIG. 8 illustrates the variation in the disbondment force of the acrylic polymer between the two polyester films used in the quality-check method as a function of time, expressed in weeks, plotted along the x-axis. The disbondment force, plotted along the y-axis, is expressed in newtons/cm. The presence of an approximately horizontal plateau after a week demonstrates the permanent tackiness of the resin. The adhesive strength therefore does not deteriorate over time.

Figure 2:
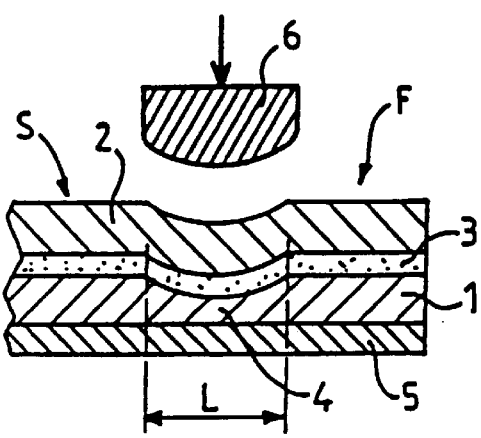
FIG. 2 is a diagrammatic section,-similar to FIG. 1, illustrating the operation of welding the sheet to the edge of a container.

In order to seal the container C, the structure S, defined by the sheet F having at least three layers, is welded as a bead 4 (FIG. 2) of width L to the edge of a film 5, which is flexible or rigid depending on the type of container C in question. The film 5 may be flexible, for example, if the container C consists of a flexible pocket; the film 5 may be rigid, for example, if the container C consists of a tray, as described later with regard to FIGS. 4 and 5.

The welding parameters (pressure, temperature and time) are net depending on the nature of the welding layer 1 and of the layer for conjugate welding provided on the film 5. The welding is carried out using a heated tool 6 suitable for clamping the sheet F against the film 5 in the region of the bead 4. The sheet F deforms momentarily during the welding, resulting in permanent deformations which remain after removing the tool 6. Because of the nature of the exterior layer 2, the latter does not melt and is permanently deformed very little. On the other hand, the welding layer 1 undergoes a maximum amount of deformation because it melts and because of the pressure exerted by the welding tool 6. The same applies to the adhesive layer 3. The welding layer 1 and the adhesive layer 3 are thus weakened in region of the bead 4.

The welding parameters and the parameters relating to the bond between the adhesive layer 3 and the welding layer 1, as well as with the exterior layer 2, are chosen so that the weld between the bead 4 of the welding layer and the edge of the film 5 of the container has a tear strength greater than the strength of adhesion between the welding layer 1 and the adhesive layer 3. Furthermore, the adhesive layer 3 adheres strongly to the exterior layer 2.

Figure 3:
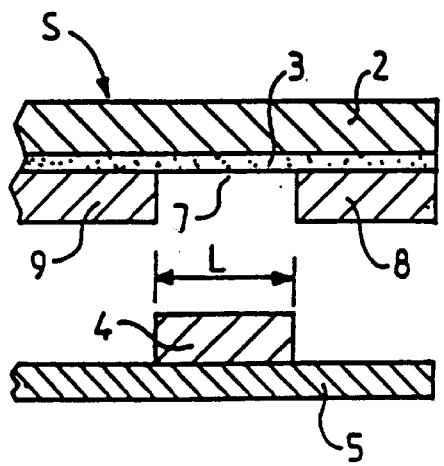
FIG. 3 is a diagrammatic section, similar to FIG. 2, illustrating the operation of opening the container and the separation from the bead of the welding layer which remains around the edge of the container.

Under these conditions, at the first occasion of exposing the opening of the container, by pulling the sheet F away from the film 5 of the container, the welded bead 4 of the welding layer remains in place around the edge of the film 5, as illustrated in FIG. 3, and separates from the rest of the welding layer 1 and from the adhesive layer 3, the latter thus being uncovered over an area 7 corresponding to the bead 4.

The bead 4 lies between the outer boundary and the inner boundary of the edge of the film 5 in such a way that the uncovered area 7 of the layer 3 is between an outer band 8 and an inner strip 9 of the welding layer which continue to protect the adhesive layer.

After opening the container C for the first time, it may be sealed again by pressing the uncovered area 7 of the adhesive layer against the bead 4 of welding layer that has remained in place around the edge of the film 5 of the container. The adhesive layer 3 adheres to this part 4 of the welding layer and the integrity of the package is re-established. This operation can be repeated several times without degrading the system.

The repositioning of the films in the weld area may be facilitated by choosing, for the exterior layer 2 of the sheet F, a "backing film" providing good rigidity. The adhesion between the exposed part 7 of the adhesive layer and the bead 4 of the welding layer that has remained around the edge of the container will be greater the greater the pressure exerted when resealing.

The layers of which the sheet F is composed may be transparent, thereby making it possible for the entire sheet F to be made transparent for the case in which it is desired to see the packaged product inside the container.

Figure 5:
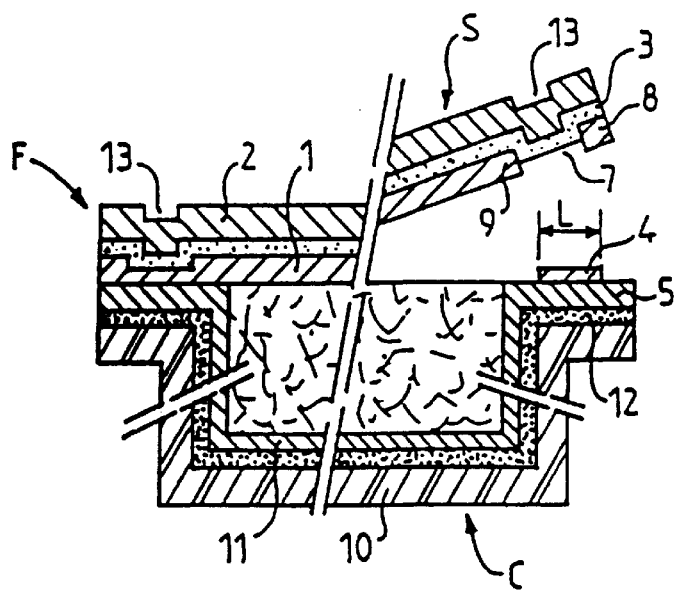
FIG. 5 shows, in a similar way to FIG. 4, the container and the sealing structure after opening.

FIGS. 4 and 5 illustrate one embodiment of a container C consisting of a package intended for the packaging of diced bacon (foodstuff) under a gas. The package is composed of:

the sealing structure S, also called the cover, according to the invention described previously; and a lower container C consisting of a thermoformed film in the form of a shell intended to receive the diced bacon before the package is sealed.

The sealing structure S was composed of:

the exterior layer 2 made of biaxially oriented polyester having a thickness of 50 micrometers;

an adhesive layer 3, made from the acrylic polymer defined above, or the adhesive based on a thermoplastic elastomer, having a thickness of 10 micrometers; and a welding layer 1 made of high-density polyethylene having a thickness of 20 micrometers.

This structure was manufactured on a machine known by the name "Hot Melt".

The acrylic polymer or the hot-melt adhesive based on a thermoplastic elastomer was coated at a temperature of 180° C. on the 50 micrometre biaxially oriented polyester film making up the exterior layer 2. The speed of the line was adjusted so as to deposit acrylic polymer to a thickness of 10 micrometers. Next, the 20 micrometre high-density polyethylene film, making up the welding layer 1, was calendered to the adhesive layer 3 using a pressure of about 10 bar ($10 \times 10^5$ Pa). The three-layer sheet F thus obtained was wound up into a reel and stored for seven days before being used (sterilization period).

The film used for manufacturing the container C consists of a rigid PVC (polyvinyl chloride) film 10 having a thickness of 450 micrometers laminated to a linear polyethylene film 11 having a thickness of 50 micrometers, this film 11 being on the inside of the container. The lamination was achieved using a layer 12 of a two-part polyurethane adhesive in a solvent medium corresponding to a thickness of approximately 2 micrometers.

The packaging operation was carried out on a thermoforming machine by producing, in the peripheral region 13, a weld of the bead type, having a width L of 5 mm, it being possible to re-inject a gas.

The thermoforming parameters for the lower rigid film, formed by the assembly 10-11-12, were as follows:

preheat temperature=150° C., lasting 1.7 seconds;

film-laminating pressure=1.8 bar ($1.8 \times 10^5$ Pa);

forming time=1.7 seconds;

forming pressure=2.8 bar ($2.8 \times 10^5$ Pa); and forming depth=20 mm.

The parameters for welding the sheet F to the edge 5 of the thermoformed shell of the container were:

temperature=150° C.;

pressure=4.5 bar ($4.5 \times 10^5$ Pa); and time=2 seconds.

It should be noted that the parameters may vary depending on the thermoforming machine used. This is because there are larger or smaller tolerances in the measurement of the parameters depending on the type of machine used.

Measurements were carried out on the trays corresponding to the container C shown in FIGS. 4 and 5.

Before welding, the strength of adhesion between the biaxially oriented polyethylene terephthalate exterior layer 2 and the high-density polyethylene welding layer 1 was 10 N (newtons)/15 mm.

After welding the bead 4 to the edge of the film 5 of the thermoformed shell, the tear force to be exerted in order to open the container was about 15 N/15 mm.

After repositioning the sealing structure in the region of the weld, on the bead 4 that has remained fixed to the edge 5, an adhesive strength of 6 N/15 mm was obtained and this remained constant during the ten opening-and-sealing tests. The package was put in a refrigerator at a temperature of 4° C. for seven days and no disbandment of the sheet F of the sealing structure with respect to the edge of the film 5 of the container was observed.

Other examples of structure according to the invention are provided below:

I/ exterior layer 2, made of biaxially oriented polyamide, having a thickness of 15 micrometers;

adhesive layer 3, made-of acrylic polymer or of hot-melt adhesive based on a thermoplastic elastomer, having a thickness of 10 micrometers;

welding layer 1, made of high-density polyethylene, having a thickness of 20 micrometers.

II/ exterior layer 2, made of rigid PVC (with a thickness of 400 micrometers)/polyurethane adhesive (2 micrometers)/biaxially oriented polyethylene terephthalate (having a thickness of 12 micrometers);

adhesive layer 3: acrylic polymer having a thickness of 10 micrometers;

welding layer 1: high-density polyethylene having a thickness of 20 micrometers.

III/ exterior layer 2, made of amorphous polyethylene terephthalate (having a thickness of 400 micrometers)/polyurethane adhesive (having a thickness of 2 micrometers)/biaxially oriented polyethylene terephthalate (having a thickness of 12 micrometers);

adhesive layer 3: acrylic polymer or hot-melt adhesive based on a thermoplastic elastomer, in layers having a thickness of 10 micrometers;

welding layer 1: high-density polyethylene, having a thickness of 20 micrometers.

The invention therefore allows the container, in particular the package, to be easily opened and then sealed, ensuring its integrity. The invention can be applied to any type of package having at least one weld region. The food-contact conformity of the layers of which the sealing structure and the container are composed allow them to be used for packaging foodstuffs.

The multilayer sealing structure S can be used on any type of packaging machine producing at least one weld. Unlike the solutions of the prior art, such as closures formed by the mechanical interaction of hooks, the invention does not require any modification of the packaging equipment since the multilayer sealing structure is in the form of a simple film and does not require the addition of accessories such as hooks in the form of tongue/groove strips or of adhesive strips. Before it is opened, the package keeps all its mechanical and barrier properties necessary for the proper preservation of the product packaged.

What is claimed is:

1. Sealing structure (S) for a container (C) provided with an opening (O), comprising a sheet (F) welded around the edge of the opening of the container, wherein the sheet (F) comprises three layers, namely a welding layer (1) pressed against and welded as a bead (4) to the edge of the opening, a barrier-forming exterior layer (2) and an intermediate adhesive layer (3) formed by depositing a resin to a minimum thickness of 10 micrometers, the welding layer having been weakened in the region of the bead (4), the said weakening having essentially taken place by the welding of the bead (4) using a hot tool (6) so as to deform the welding layer (1) and the adhesive layer (3), said deformation being substantially over the entire bead width, the weld between the bead (4) of the welding layer and the edge of the opening having a tear strength greater than the strength of adhesion between the welding layer (1) and the adhesive layer (3) so that, at the first occasion of exposing the opening (O), the welded bead (4) of the welding layer remains in place around the edge of the opening and separates, by tearing, from the rest of the welding layer (1) and from the adhesive layer (3), which adhesive layer is thus uncovered over an area (7) corresponding to the said bead (4), it being possible for the container (C) to be sealed again by pressing the uncovered area (7) of the adhesive layer against the bead (4) of the welding layer that has remained in place.

2. Sealing structure according to claim 1, characterized in that the uncovered area (7) of the adhesive layer, after the first opening, is between two bands or strips (8, 9) of the welding layer.

3. Sealing structure according to claim 1, characterized in that the exterior layer (2) is a flexible film, in particular having a thickness of approximately 50 micrometers.

4. Sealing structure according to claim 3, characterized in that the exterior layer (2) is made of biaxially oriented polyester.

5. Sealing structure according to claim 1, characterized in that the exterior layer (2) is a rigid film.

6. Sealing structure according to claim 1, characterized in that the welding layer (1) consists of a thin film, the thickness being, in particular, about 20 micrometers, which is easy to tear, or of a thicker film having easy-tear properties obtained by adjusting the extrusion parameters or by adding mineral fillers.

7. Sealing structure according to claim 1, characterized in that the adhesive layer (3) is formed by a permanently tacky acrylic polymer, which is solid at room temperature, or by a hot-melt adhesive based on a thermoplastic elastomer.

8. Sealing structure according to claim 1, characterized in that the materials of which the layers are composed comply with food-contact regulations.

9. Sealing structure according to claim 1, characterized in that the adhesive layer is made of a hot-melt adhesive based on a thermoplastic elastomer having a melting point of between 85 and 95° C.

10. Sealing structure according to claim 1, characterized in that the adhesive layer is made of a hot-melt adhesive based on a thermoplastic elastomer having a dynamic viscosity of 15,000 mPa.s at 150° C., of 11,100 mPa.s at 160° C. and of 8000 mPa.s at 170° C.

11. Sealing structure according to claim 1, characterized in that the adhesive of the adhesive layer is chosen so as to provide an adhesive strength of approximately 900 grams force/cm$^2$ after 1 minute of contact and approximately 1100 grams force/cm$^2$ after 7 minutes of contact, the adhesive strength being measured using a 50 micrometre layer of adhesive sandwiched between two polyester layers and a pressure of $10 \times 10^5$ Pa having been applied on an 8×8 mm square area.

12. Sealing structure according to claim 1, characterized in that the welding layer is made of high-density polyethylene.

13. Sealing structure according to claim 1, characterized in that the layers of which the sheet (F) is composed are transparent so that the sheet (F) itself is transparent.

14. Sealing structure according to claim 1, characterized in that the welding layer is made of high-density polyethylene and in that the layers of which the sheet (F) is composed are transparent so that the sheet (F) itself is transparent.

15. Sealing structure according to claim 1, characterized in that the nature of the exterior layer is such that it does not undergo melting and is permanently deformed very little.

16. Container provided with an opening sealed by a sheet welded around the edge of the opening, characterized in that the sheet consists of a sealing structure according to claim.

17. Method of sealing a container provided with an opening by a sheet welded around the edge of the opening, wherein a sheet (F) is used which consists of at least three layers, namely a welding layer (1) to be pressed against the edge of the opening, a barrier-forming exterior layer (2) and an intermediate adhesive layer (3), formed by depositing a resin to a minimum thickness of 10 micrometers, and in that the welding layer (1) is welded to the edge of the opening as a bead (4) having a tear strength greater than the strength of adhesion between the welding layer (1) and the adhesive layer (3), the weld being produced using a hot tool (6) so as to cause weakening, by deformation, of the welding layer (1) and of the adhesive layer (3) in the region of the bead (4), the said weakening constituting most of the weakening of the said layers (1) and (3), and said deformation being substantially over the entire bead width, so that, at the first occasion of exposing the opening (O) of the container, the welded bead (4) of the welding layer remains in place around the edge of the opening and separates, essentially by tearing, from the rest of the welding layer and from the adhesive layer (3).

18. Sealing method according to claim 17, characterized in that, in order to produce the multilayer sheet (F), the adhesive layer (3) is formed by an adhesive resin extruded, hot, between the exterior layer (2) and the welding layer (1).

19. Sealing method according to claim 17, characterized in that the multilayer sheet (F) is produced by depositing, hot, the adhesive layer (3) on the exterior layer (2) before calendering the welding layer (1).

20. Method according to claim 17, characterized in that the adhesive layer is made of a hot-melt adhesive based on a thermoplastic elastomer having a melting point of between 85 and 95° C.

21. Method according to claim 17, characterized in that the adhesive layer is made of a hot-melt adhesive based on a thermoplastic elastomer having a dynamic viscosity of 15,100 mPa.s at 150° C., of 11,100 mPa.s at 160° C. and of 8000 mPa.s at 170° C.

22. Method according to claim 17, characterized in that the welding layer is made of high-density polyethylene.

23. Method according to claim 17, characterized in that the layers of which the sheet (F) is composed are transparent so that the sheet (F) itself is transparent.

24. Method according to claim 17, characterized in that the nature of the exterior layer is such that it does not undergo melting and is permanently deformed very little.

25. Method according to claim 17, characterized in that the exterior layer is a flexible film, in particular having a thickness of approximately 50 micrometers.

26. Method according to claim 17, characterized in that the exterior layer is made of biaxially oriented polyester.

27. Method according to claim 17, characterized in that the exterior layer is a rigid film.

28. Method according to claim 17, characterized in that the welding layer consists of a thin film, the thickness being in particular about 20 micrometers, which is easy to tear, or of a thicker film having easy-tear properties obtained by adjusting the extrusion parameters or by adding mineral fillers.

29. Sealing structure (S) for a container (C) provided with an opening (O), comprising a sheet (F) welded around the edge of the opening of the container, wherein the sheet (F) comprises three layers, namely a welding layer (1), made of polyethylene and of which thickness being about 20 micrometers, which is easy to tear, or of a thicker film having easy-tear properties obtained by adjusting the extrusion parameters or by adding mineral fillers, pressed against and welded as a bead (4) to the edge of the opening, a barrier-forming exterior layer (2) and an intermediate adhesive layer (3) formed by depositing a resin to a minimum thickness of 10 micrometers, the resin is a permanently tacky acrylic polymer, which is solid at room temperature, or by a hot-melt adhesive based on a thermoplastic elastomer, the welding layer having been weakened in the region of the bead (4), the said weakening having essentially taken place by the welding of the bead (4) using a hot tool (6) so as to deform the welding layer (1) and the adhesive layer (3), said deformation being substantially over the entire bead width, the weld between the bead (4) of the welding layer and the edge of the opening having a tear strength greater than the strength of adhesion between the welding layer (1) and the adhesive layer (3) so that, at the first occasion of exposing the opening (O), the welded bead (4) of the welding layer remains in place around the edge of the opening and separates, by tearing, from the rest of the welding layer (1) and from the adhesive layer (3), which adhesive layer is thus uncovered over an area (7) corresponding to the said bead (4), it being possible for the container (C) to be sealed again by pressing the uncovered area (7) of the adhesive layer against the bead (4) of the welding layer that has remained in place.

30. Method of sealing a container provided with an opening by a sheet welded around the edge of the opening, wherein a sheet (F) is used which consists of at least three layers, namely a welding layer (1) made of polyethylene to be pressed against the edge of the opening, wherein thickness of the welding layer is about 20 micrometers, which is easy to tear, or of a thicker film having easy-tear properties obtained by adjusting the extrusion parameters of by adding mineral fillers a barrier-forming exterior layer (2) and an intermediate adhesive layer (3), formed by depositing a resin to a minimum thickness of 10 micrometers, wherein the resin is a hot-melt adhesive based on a thermoplastic elastomer having a melting point of between 85 and 95° C., and in that the welding layer (1) is welded to the edge of the opening as a bead (4) having a tear strength greater than the strength of adhesion between the welding layer (1) and the adhesive layer (3), the weld being produced using a hot tool (6) so as to cause weakening, by deformation, of the welding layer (1) and of the adhesive layer (3) in the region of the bead (4), the said weakening constituting most of the weakening of the said layers (1) and (3), and said deformation being substantially over the entire bead width, so that, at the first occasion of exposing the opening (O) of the container, the welded bead (4) of the welding layer remains in place around the edge of the opening and separates, essentially by tearing, from the rest of the welding layer and from the adhesive layer (3).

\* \* \* \* \*